Sept. 22, 1931.  J. H. BOYDEN  1,824,116
FOUNTAIN UNIT
Filed Oct. 3, 1928    3 Sheets-Sheet 1

INVENTOR
JOHN HANSON BOYDEN
By Paul, Paul & Moore
ATTORNEYS

Sept. 22, 1931.  J. H. BOYDEN  1,824,116
FOUNTAIN UNIT
Filed Oct. 3, 1928   3 Sheets-Sheet 2
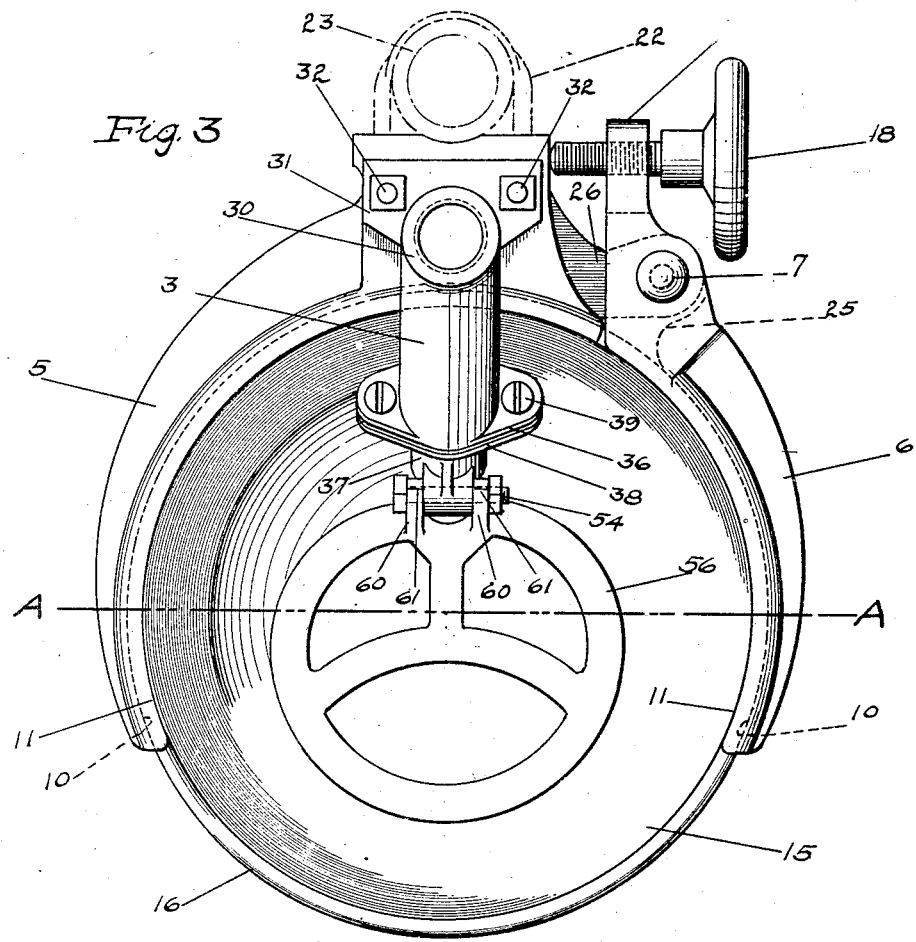
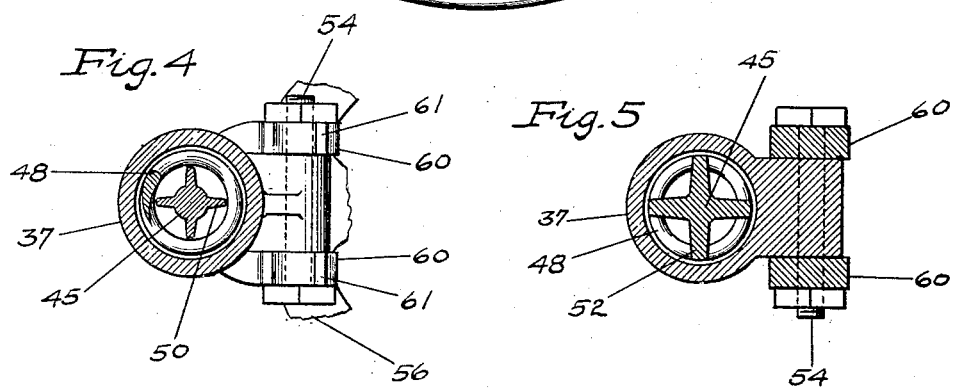
INVENTOR
JOHN HANSON BOYDEN
BY Paul, Paul & Moore
ATTORNEYS

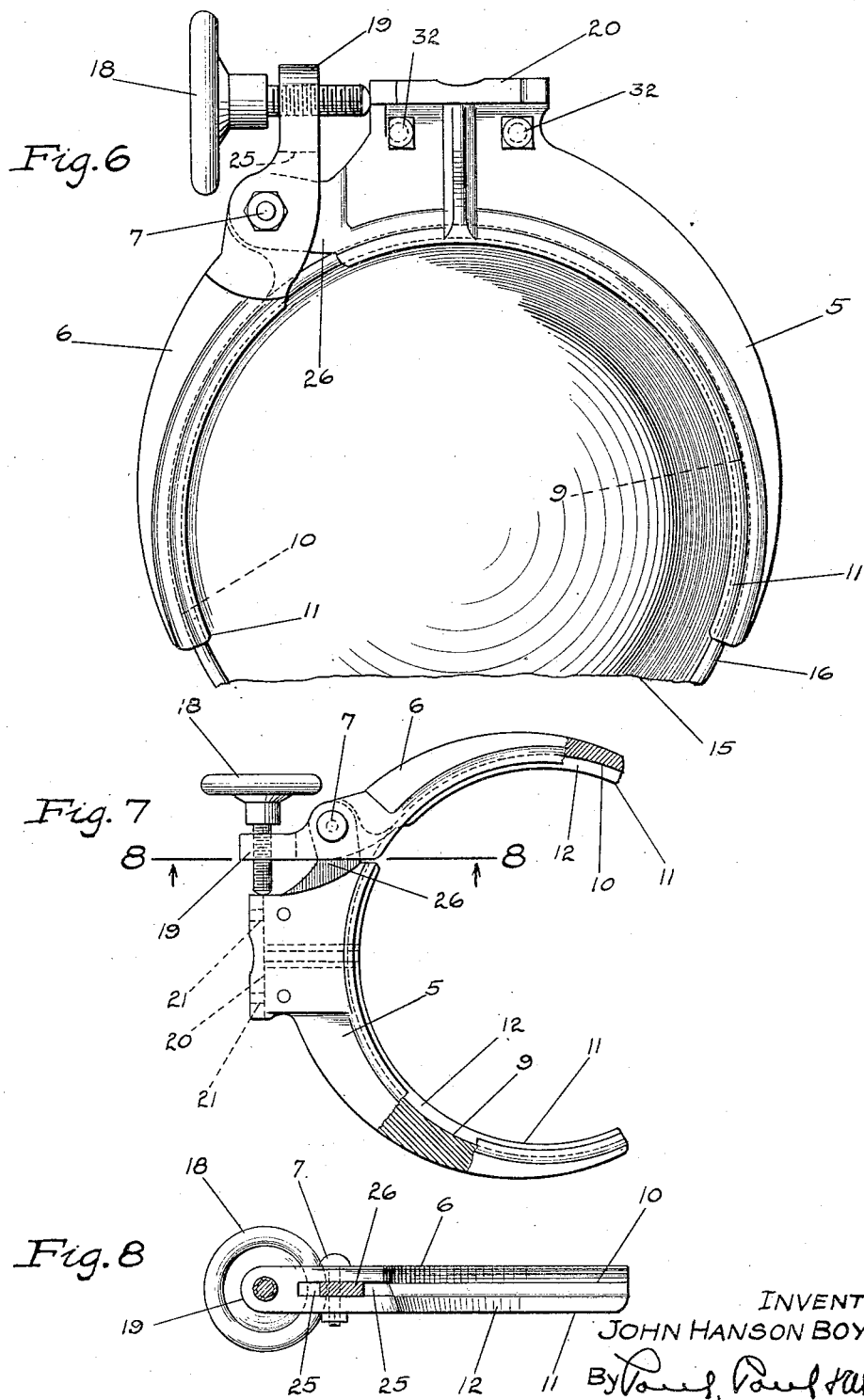

Patented Sept. 22, 1931

1,824,116

UNITED STATES PATENT OFFICE

JOHN HANSON BOYDEN, OF GLENDALE, MARYLAND, ASSIGNOR TO H. D. HUDSON MANUFACTURING COMPANY, OF MINNEAPOLIS, MINNESOTA, A CORPORATION OF MINNESOTA

FOUNTAIN UNIT

Application filed October 3, 1928. Serial No. 310,004.

This invention relates to improvements in drinking fountains or the like, and has among its objects to provide a drinking bowl, and to mount the bowl upon a support in a manner to have the support protect it and reinforce it; to provide a liquid supply pipe for the bowl and a valve for controlling the liquid supply, and to mount this device independently of the bowl, and upon that element which supports and protects the bowl; to provide a valve operating mechanism arranged within the bowl and positioned to be operated by the drinker; to provide such a means and arrange it so that it cannot assume a non-valve operating position; and to generally provide a cheap construction which can be easily assembled.

Features of the invention include all the details of construction, as well as the broader aspects of the invention.

Features and advantages of the invention will appear in the description of the drawings forming a part of this application, and in said drawings Figure 1 is a vertical section;

Figure 3 is a top plan view of the complete device, showing its detachable relation to a tubular support;

Figure 4 is a section on line 4—4 of Figure 1;

Figure 5 is a section on line 5—5 of Figure 1;

Figure 6 is a bottom plan;

Figure 7 is a top plan with the valve and water pipe connection removed;

Figure 8 is a detail vertical section taken on line 8—8 of Figure 7.

A feature of the device is the mounting of the water supply pipe or conduit and the valve upon an element with supports the bowl in operative position in relation to the valve and the supply pipe, forming a unit which can be attached to a support, and to which the bowl can be detachably secured. The bowl clamp and water supply pipe support is formed in two pieces, one designated 5, and the other 6. These two elements are pivoted together as at 7. Each element is provided with a groove, the grooves being respectively designated 9, 10.

Figure 1:
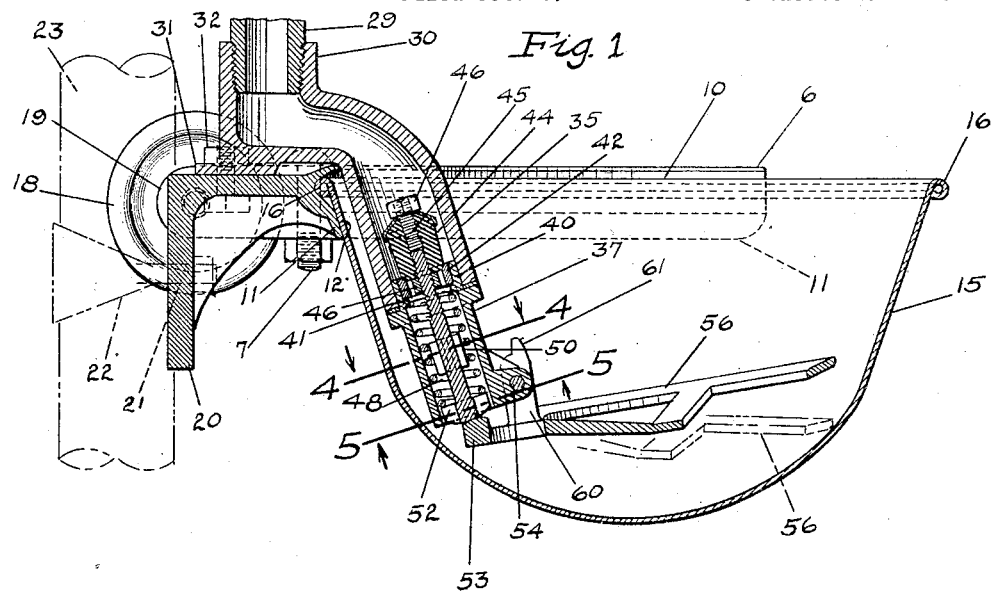

A feature of the invention is the formation of the bowl supporting element to protect and reinforce the bowl. As best shown in Figure 1, each arm of the support, in addition to the groove, has a downward extension 11 provided with a flat face 12 which engages the bowl at a point below its rim bead 16 to reinforce it. The face of this extension 11, will ordinarily conform to the configuration of surface of the bowl. This is a valuable feature, because experience has shown that unless the bowls are reinforced in some manner, the sometimes competitive struggle of animals to use the drinking fountain causes breakage of the bowl. Moreover the frequent collision of animal bodies with the bowl, when the force is applied in a horizontal direction, results in breakage of the bowl unless some sort of reinforcement is provided. It will be understood that when the device is in operative position as shown for example in Figure 6, the grooves 9—10, cooperate to form a continuous, in this instance, circular groove, having an arc greater than 180°. By this means the arms 5 and 6 each extend beyond a diameter A (see Figure 3) of the bowl 15. The bowl is provided with a bead 16 which lies within the grooves 9 and 10 when the device is in clamping position. Hand screw 18 is threaded into an extension 19 of the arm 6 and impinges a portion of the arm 5, as clearly shown in Figures 3, 6 and 7. It is evident that upon rotation of the element 18 in the proper direction, movement of the jaws or arms 5 and 6 will be obtained to bring them to operative position. This method of clamping protects the bowl against breakage, by reinforcing the upper region of the vessel throughout a substantial portion of the periphery. Another advantage is the ease of attachment and detachment for cleaning. The arm 5 may be considered a bracket, and has a down turned portion 20, see Figures 1 and 2, and is bored as at 21, see Figure 7, for the reception of the bolts of a clip indicated in dotted lines at 22, which in this instance embraces a tubular member 23, shown in dotted lines, to clampingly but detachably secure the device in operative position. In this instance the arm 6 is slotted as at 25, see Figure 8, the arm 5 has an extension 26 operative in the slot, and the pivot 7 traverses both elements.

Other features of the invention are the mounting of the liquid supply pipe, and the arrangement and construction of the valve for controlling it, all upon the clamping and supporting element which includes the members 5 and 6. This liquid supply element, which may be considered a valve-controlled spigot, is detachably secured and for this purpose is provided with a vertical portion 30 threaded to receive the supply pipe 29, said portion having a base flange 31 which engages the element 5, and which is secured by any suitable means 32. Leading from the portion 30 and curving downwardly into the bowl is an extension 35, having such an angular relation and being so spaced that the bowl can be introduced between it and the element 5. This relation is best shown in Figure 1. This spigot portion 35 is provided at its bottom end with lateral extensions 36 (see Figures 2 and 3) and a tubular valve supporting extension 37 has elements 38 complemental to the elements 36, suitable fastening devices 39 being employed to clampingly secure the elements together.

The valve supporting and valve seat-forming element has a tubular extension 40 fitting the bore of the extension 35 (see Figure 1). Within a bore of the element 37 is formed a shoulder 41 abuttingly arranged against which is a sleeve 42 constituting a valve seat against which a valve element 44 normally engages when the device is not in use. The element 44 is arranged upon a stem 45 and is held in its adjusted position by nuts 46, one arranged at each opposite side. To forcibly hold the element 44 against its seat, a coil spring 48 is provided which surrounds the stem as shown, and the stem is provided with fins 50 which act to center the spring and permit circulation through the passage. The inner end of the spring abuts that portion of the element 37 which forms a shoulder 41 and its opposite end engages a spider-like abutment 52 of the stem which, in this instance, when the valve is seated, projects slightly below the extension 37. Abutment 52 is engaged by one arm 53 of a lever-like valve operating element, pivoted as at 54 to an extension of the element 37, and having its other arm 56 shaped substantially as shown in Figure 3 of the drawings and arranged in this instance to be engaged and depressed by the nose of an animal. This depression will result in the opening of the valve and the delivery of the water to the bowl, and the valve control element will automatically move to closed position upon release.

Figure 2:
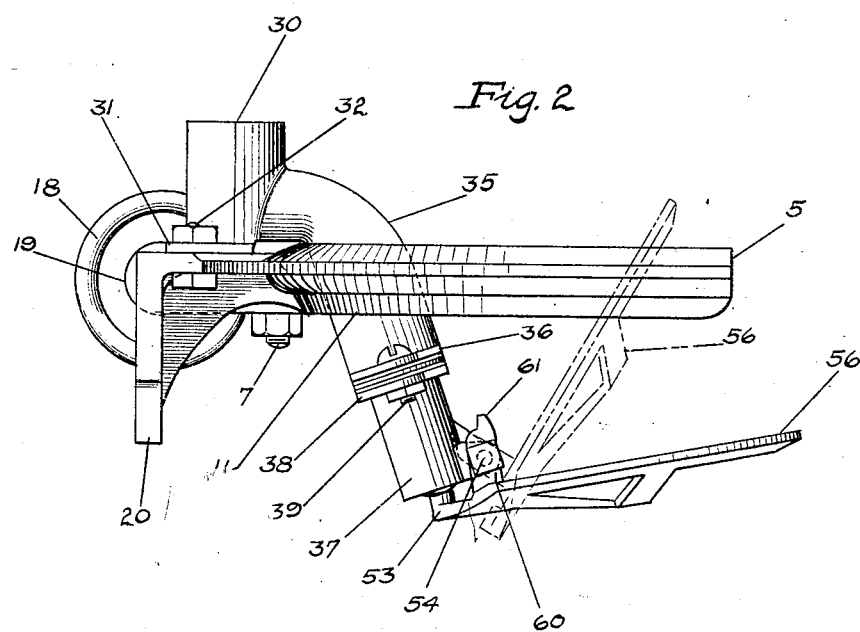
Figure 2 is a side elevation of the knockdown unit with the bowl removed.

In order to prevent a movement of the valve control element to an inoperative position, for example against the element 35, it is pivoted by means of an extension 60 and this extension projects beyond the pivot 54 as at 61 and engages the element 37 to limit the movement of the control element substantially at the position in dot and dash lines in Figure 2. This is a feature of the invention.

It will be noted that practically all of the elements of the device are detachable and renewable, to-wit: the two clamping elements 5 and 6; the conduit in relation to one of the clamping elements; the valve supporting and seating forming element in relation to the conduit; the valve mechanism in relation to the valve seating element; and the valve control element in relation to the valve seating element, and to a bowl clampingly held by the elements 5 and 6. These are valuable features of the invention providing a knock-down structure. Moreover a valuable feature of the invention is the unitary relation of the clamping element and the water supply conduit and controlling valve therefor.

I claim as my invention:

1. An element adapted to be detachably secured to a support and having means adjustable to clampingly circumferentially engage the rim of a receptacle to secure the same in liquid-retaining position, and also to reinforce the receptacle, a liquid supply conduit carried by the element and having a portion arranged to lie within a receptacle supported by the element, said conduit having a valve, and a valve control means carried by the conduit and also arranged to lie within the supported receptacle, and positioned to be operated by a portion of the nose of a drinker when the mouth is positioned to withdraw liquid from the receptacle.

2. A support, an element detachably secured thereto and having adjustable clamping elements, said elements having means to circumferentially and protectingly engage the rim of a drinking vessel, and a liquid supply conduit carried by one of the clamping elements and having a valve, an element secured to said supply conduit and adapted to lie within the vessel, in a position to be moved by the drinker when in drinking position to open the valve.

3. A device of the class described comprising means adapted to circumferentially engage the rim of a drinking bowl and clampingly support the bowl, and means detachably supported by said clamping means for delivering water into the bowl.

4. A device of the class described comprising two pivoted-together arms adapted to circumferentially engage the rim of a drinking bowl and clampingly support the bowl, and means supported by one of the arms of said clamping means for delivering water into the bowl.

5. A pair of pivoted arms cooperable to support a drinking bowl by engagement with the bowl rim throughout a substantial portion of its circumference, and having portions which protectingly overlie the rim.

6. A pair of pivoted arms cooperable to support a drinking bowl by engagement with the bowl rim throughout a substantial portion of its circumference, one of the members having means for attaching it to a support, and means detachably secured to one of said clamping elements and adapted to deliver water into the bowl.

7. In combination, a receptacle having a rim bead, a pair of arcuate members, each having a groove which overlies the rim and receives the bead and each member having a portion which engages the wall of the receptacle below the bead to reinforce the receptacle adjacent its open side, and means pivoting the members to swing from one another to release the receptacle.

8. In combination, a receptacle having a rim bead, a pair of arcuate members each having a groove which overlies the rim and receives the bead and each member having a portion which engages the wall of the receptacle below the bead to reinforce the receptacle adjacent its open side, means pivoting the members to swing from one another to release the receptacle and means for applying clamping pressure to bring the elements against the receptacle.

9. An arm having means adapted to detachably secure it to a support, a second arm pivoted to the first and adjustable to secure a receptacle between the arms, said arms being adapted to engage the rim of a receptacle as well as a portion of the receptacle below the rim for a substantial portion of the circumference, and a liquid supply conduit detachably secured to the top of one of the arms and having a portion arranged to deliver liquid within a receptacle supported by the arms.

10. An arm having means for detachably securing it to a support, a second arm pivoted to the first and adapted to cooperate with the first arm to clampingly support a receptacle, and having means protectingly overlying the rim throughout a substantial part of the rim circumference.

In witness whereof, I have hereunto set my hand this 14th day of Sept. 1, 1928.

JOHN HANSON BOYDEN.